United States Patent
Blackwell

(10) Patent No.: US 8,904,469 B2
(45) Date of Patent: Dec. 2, 2014

(54) DISTRIBUTION OF AMBIENCE AND CONTENT

(75) Inventor: Robin John Blackwell, Redhill (GB)

(73) Assignee: Koninklijke Philips N.V., Eindhoven (NL)

( * ) Notice: Subject to any disclaimer, the term of this patent is extended or adjusted under 35 U.S.C. 154(b) by 1367 days.

(21) Appl. No.: 12/304,125

(22) PCT Filed: Jun. 12, 2007

(86) PCT No.: PCT/IB2007/052210
§ 371 (c)(1),
(2), (4) Date: Dec. 10, 2008

(87) PCT Pub. No.: WO2007/144823
PCT Pub. Date: Dec. 21, 2007

(65) Prior Publication Data
US 2009/0254959 A1    Oct. 8, 2009

(30) Foreign Application Priority Data

Jun. 13, 2006 (EP) .................................. 06115350

(51) Int. Cl.
| | | |
|---|---|---|
| *H04N 7/173* | (2011.01) | |
| *H04N 7/16* | (2011.01) | |
| *H04N 21/475* | (2011.01) | |
| *H04N 21/41* | (2011.01) | |
| *H04N 21/8405* | (2011.01) | |
| *H04N 21/235* | (2011.01) | |
| *H04N 21/43* | (2011.01) | |
| *H04N 21/2343* | (2011.01) | |
| *H04N 21/435* | (2011.01) | |
| *H04N 21/434* | (2011.01) | |

(52) U.S. Cl.
CPC ......... *H04N 21/435* (2013.01); *H04N 21/4755* (2013.01); *H04N 21/4122* (2013.01); *H04N 21/8405* (2013.01); *H04N 21/235* (2013.01); *H04N 21/4307* (2013.01); *H04N 21/234318* (2013.01); *H04N 21/4345* (2013.01)

USPC .......................................... 725/136; 725/110

(58) Field of Classification Search
None
See application file for complete search history.

(56) References Cited

U.S. PATENT DOCUMENTS

| | | | |
|---|---|---|---|
| 6,363,434 B1 | 3/2002 | Eytchison | |
| 7,725,917 B2 * | 5/2010 | Lee et al. | ....................... 725/135 |
| 2002/0116471 A1 | 8/2002 | Shteyn | |
| 2004/0260669 A1 * | 12/2004 | Fernandez | ........................ 707/1 |

FOREIGN PATENT DOCUMENTS

| | | | | |
|---|---|---|---|---|
| WO | 02100092 A1 | 12/2002 | | |
| WO | 2004006578 A2 | 1/2004 | | |
| WO | 2004008764 A1 | 1/2004 | | |
| WO | WO 2004006578 A2 * | 1/2004 | ............... | H04N 7/08 |

\* cited by examiner

*Primary Examiner* — Mark D Featherstone

(57) ABSTRACT

A system for supporting entertainment distribution via at least one network comprises a content provider (100) for distributing a program; a metadata provider (102) for distributing metadata, the metadata including a content reference identifier of the program and data relating to ambience complementing the program. The system further comprises a user terminal (118) comprising an input (106) for receiving the metadata; an input (106) for receiving the program using the content reference identifier; a rendering unit (116) for rendering the received program; an ambience generator (108) for generating an ambient effect different from audio or video; and an ambience controller (110) for controlling the ambience generator synchronously with the rendering of the content, based on the received data relating to ambience complementing the program.

17 Claims, 3 Drawing Sheets

DISTRIBUTION OF AMBIENCE AND CONTENT

Figure 1:
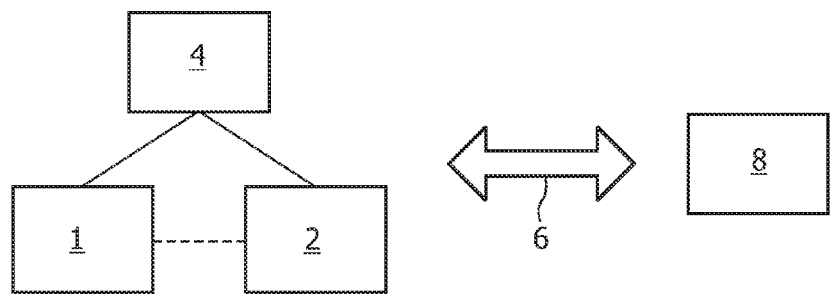

The invention relates to a system for supporting entertainment distribution via at least one network. The invention also relates to metadata provider, a user terminal, a method, a computer program product, a signal, and an XML file.

A recent development in display technology is the ambilight. This technology illuminates the wall behind a display such as a television according to colors of the content being rendered in order to create an enhanced viewing experience. Also, other types of ambience are known, including heating and room lighting. The amBX platform has been established as an 'experience engine' to allow ambience to be not only derived from the colors being rendered on the display, but also influenced by creative editors of an ambience script that (partially) prescribes the type of ambience effects that will occur at any given time. These amBX scripts are primarily directed towards the gaming industry, meaning that the amBX scripts are used to define the ambient experience generated when playing a game on a PC or game console. In the future, the support will be extended to applications beyond gaming, including music and video.

TV-Anytime is an emerging platform being developed by the TV-Anytime Forum in phases. TV-Anytime phase 1 addresses the areas of metadata, content referencing, and rights management and protection. TV-Anytime phase 2 addresses in due time technologies related to content packaging, remote programming, content and user profile sharing. See: The TV-Anytime Forum, "Specification Series: S-2 (Phase 2) on: System Description", Final Specification, SP002v2.0, date: 8 Apr. 2005, www.tv-anytime.org. TV-Anytime phase 2 supports new content types other than linear audio/video such as games, web pages, music files, graphics, and data. These new content types are treated on their own as non audio-video programs and/or as components of a package. The concept of packaging enables the combination of games, applications and interstitial content with audio, video, still images, and text. A package consists of a collection of content items that are intended to be consumed together in some combination to provide various consumer experiences. Package description metadata also provides a mechanism to express the options for consumption depending on usage environment and user preference. Additionally, package description metadata describes temporal and spatial information between content items to allow content to be consumed as the content creator intended. Owing to synchronization information, multi-stream experience, such as alternate audio and video documentaries, can be provided with content packaging.

It would be advantageous to achieve an improved system for entertainment distribution via at least one network. To better address this concern, in a first aspect of the invention a system is presented comprising a content provider (100) for distributing a program;
a metadata provider (102) for distributing metadata, the metadata including a content reference identifier of the program and data relating to ambience complementing the program; and
a user terminal (118) comprising
an input (106) for receiving the metadata;
an input (106) for receiving the program using the content reference identifier;
a rendering unit (116) for rendering the received program;
an ambience generator (108) for generating an ambient effect different from audio or video; and
an ambience controller (110) for controlling the ambience generator synchronously with the rendering of the content, based on the received data relating to ambience complementing the program.

For example the content reference identifier is indicative of a location and/or time at which the program can be retrieved from the content provider. A content reference identifier (CRID) is a reference to content. The content can for example be resolved to its location when it is required for rendering. The content provider can distribute a program comprising digital content, for example audio and/or video content, or for example multimedia content.

The program may for example be distributed by broadcasting the program at a predetermined time or by delivering the program on demand or by podcasting. The metadata may further comprise a label, title, or image associated with the program; the user terminal may comprise interaction means for displaying the label/title/image, and enabling a user to select the associated program for rendering with or without ambience. The system allows to tailor the generated ambience to the peculiarities of a specific program. Whereas the existing ambilight effects are based on an analysis of the content being rendered, the present invention allows to create the effects in accordance to external specifications. Examples of these specifications are provided in the embodiments hereinafter. The ambience and the content become linked by their coupling in the metadata, thus making it easier to supply proper ambience data with the program to be rendered. The configuration as described allows the ambient data to be embedded in existing data protocols, which makes it especially economical to realize. It even becomes possible to provide multiple versions of a program, each version having a different ambience associated with it. The user may select the desired version he wishes to be used based on for example his mood or personal circumstances such as other people that may be around and that might be irritated by the ambient effects.

An embodiment comprises an ambience provider (104) for distributing ambience control data for creating a predetermined ambience effect synchronously with a rendering of a predetermined scene of the program;
and in this embodiment
the metadata provider is arranged for including in the metadata a content reference identifier of the ambience control data;
the user terminal further comprises an input for receiving the ambience control data using the content reference identifier of the ambience control data; and
the ambience controller is arranged for causing the ambience generator to generate the predetermined ambience effect synchronously with the rendering of the predetermined scene.

This embodiment allows the ambience effects to be determined in advance to a relatively high degree of detail. For example, the ambience control data could comprise an amBX script made especially for this particular program. The solution provided by this embodiment provides a loose coupling between ambience and program. The content provider only needs to provide the program (for example comprising audio or video data). Ambience data can be added later and/or by a different organization, without requiring any changes to the original program as provided by the content provider. Retrieval of the complete package of program with ambience is made convenient as the locations of both types of data are delivered by the metadata provider. For example, the ambience can be pre-loaded or streamed. More than one content reference identifier may be provided, pointing to different versions of the ambience control data. The different versions may be retrieved from the same ambience provider and/or from different ambience providers.

In an embodiment, the metadata provider is arranged for including a plurality of content reference identifiers of the program, and the data relating to ambience is indicative of a presence and/or a type of ambience control data accompanying the program when retrieved using the respective content reference identifiers;

the user terminal is arranged for displaying at least some of the data relating to ambience, and for enabling a user to select at least one of the plurality of content reference identifiers for receiving and rendering;

the user terminal comprises an input for receiving the program and the accompanying ambience control data using the selected content reference identifier; and the ambience controller is arranged for controlling the ambience generator synchronously with the rendering of the content, based on the received ambience control data.

The plurality of content reference identifiers can be indicative of respective locations and/or times at which different versions of essentially the same program can be retrieved. The ambience accompanying each version of the program differs. For example, a version without ambience can be supplied. Also, different versions of the program with different versions of ambience control data can be referenced in the metadata. More freedom is provided for the user, as he or she may select the version of the program with the ambience he or she prefers. Also, the user may be required to pay a different price for each version, depending on the ambience accompanying the version. Different content providers may be associated with each content reference identifier.

In an embodiment, the metadata provider is arranged for including a time stamp indicative of a moment of the program, and the data relating to ambience is associated with the time stamp; and the ambience controller is arranged for realizing the ambience as specified by the data relating to ambience at the time indicated by the time stamp.

This way, time-dependent ambience-related data may be provided within the metadata. The metadata provider may in part or completely replace the ambience provider. The time stamp or time stamps may be provided in the form of TV-Anytime segmentation metadata.

In an embodiment, the metadata provider is arranged for including, in the data relating to ambience, information characterizing the program; and the ambience controller is arranged for dynamically computing an ambience effect, to be generated by the ambience generator, based on the received program, taking into account the information characterizing the program.

The program may be characterized by for example at least one of: a content type, an intended audience, an atmosphere (such as 'breathtaking'), a keyword.

In an embodiment, the user terminal comprises means for generating information relating to properties of the ambience generator and/or relating to user settings; and an output for sending the generated information to the metadata provider; and the metadata provider comprises an input for receiving the information from the user terminal; and a metadata generator for generating the metadata to be distributed to the user terminal, taking into account the received information.

The output of the user terminal enables the metadata provider to provide tailored information specific to the properties and settings. Properties of the ambience generator may include, for example, available types of devices. User settings may include user preferences and/or privileges. This allows the system to provide only those ambience effects that the ambience generator can generate, that the user appreciates to experience, and/or that the user has access to.

In an alternative embodiment, the ambience provider comprises an input for receiving the information from the user terminal, and an ambience control generator for generating the ambience control data to be distributed to the user terminal, taking into account the received information.

In an embodiment, the ambience controller is arranged for reserving a resource of the ambience generator for use during the rendering of the received program, based on the received data relating to the ambience complementing the program.

This helps to make sure that the devices required at a certain moment during the program are ready to provide the required effects.

In an embodiment, the metadata is TV-Anytime compliant.

The types of metadata set forth can be realized using TV-Anytime. They can be realized either by using generic TV-Anytime fields, or by using proprietary fields included in the TV-Anytime data.

In an embodiment, the metadata provider is arranged for generating the metadata TV-Anytime compliant, and for including the content reference identifier associated with the ambience control data in a related material field and/or in a package of content relating to the content reference identifier associated with the program.

These ways of incorporating the content reference identifier in the TV-Anytime data are particularly convenient, as it requires relatively little modifications and/or extensions to the TV-Anytime standard.

In an embodiment, the ambient generator comprises at least one of: a light, a fan, a rumbler, a heater, a blind. The system set forth can be conveniently used to create ambience using any of these devices. The light may comprise a light generator capable of generating light having a controllable color, temperature, and/or intensity. Such a light generator can be constructed for example using a plurality of light sources, each light source emitting light with a different color and each light source having a controllable light intensity. Any of the controllable aspects of the ambience generator may be addressed by the ambience control data. Other types of devices can also be used.

An embodiment comprises a metadata provider (102) for supporting entertainment distribution via at least one network, arranged for distributing metadata, the metadata including a content reference identifier of the program and a content reference identifier of ambience control data complementing the program.

An embodiment comprises a user terminal (118) comprising an input (106) for receiving metadata including a content reference identifier of a program and data relating to ambience complementing the program;

an input (106) for receiving the program using the content reference identifier; a rendering unit (116) for rendering the received program;

an ambience generator (108) for generating an ambient effect different from audio or video;

an ambience controller (110) for controlling the ambience generator synchronously with the rendering of the content, based on the received data relating to ambience complementing the program.

An embodiment comprises distributing a program (316); distributing metadata (308), the metadata including a content reference identifier of the program and data relating to ambience complementing the program; and at a user terminal
receiving the metadata;
receiving the program using the content reference identifier;
rendering (318) the received program;
generating (318) an ambient effect different from audio or video;
controlling (318) the generating of the ambient effect synchronously with the rendering of the content, based on the received data relating to ambience complementing the program.

An embodiment comprises receiving metadata (308) including a content reference identifier of a program and data relating to ambience complementing the program;
receiving the program (316) using the content reference identifier;
rendering (318) the received program;
generating (318) an ambient effect different from audio or video;
controlling (318) the generating of the ambient effect synchronously with the rendering of the content, based on the received data relating to ambience complementing the program.

An embodiment comprises instructions for causing a processor to execute the method set forth.

An embodiment comprises an XML file for communication between devices, being TV-Anytime compliant and comprising a package including a content reference identifier referring to audio and/or video content and a content reference identifier referring to complementary ambient control data.

An embodiment comprises a digital signal for communication between devices, comprising a content reference identifier referring to audio and/or video content and a content reference identifier referring to complementary ambient control data.

Figure 2:
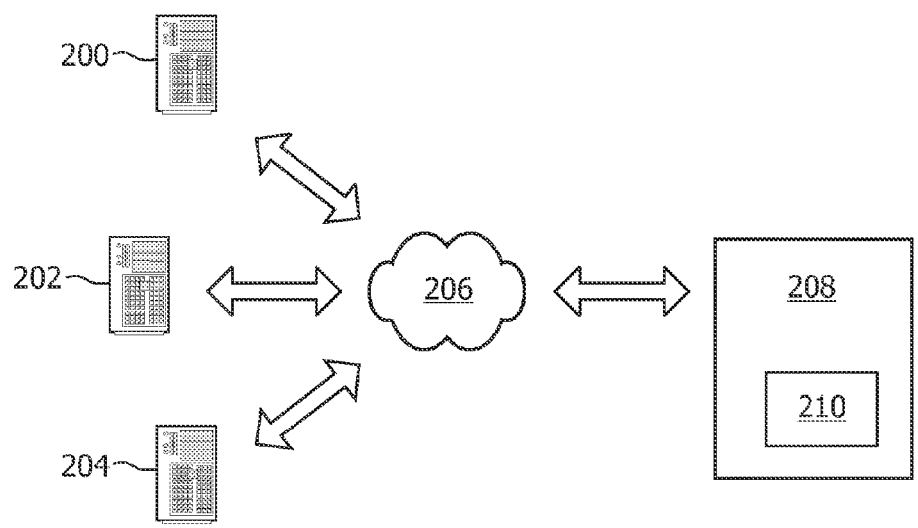
Figure 3:
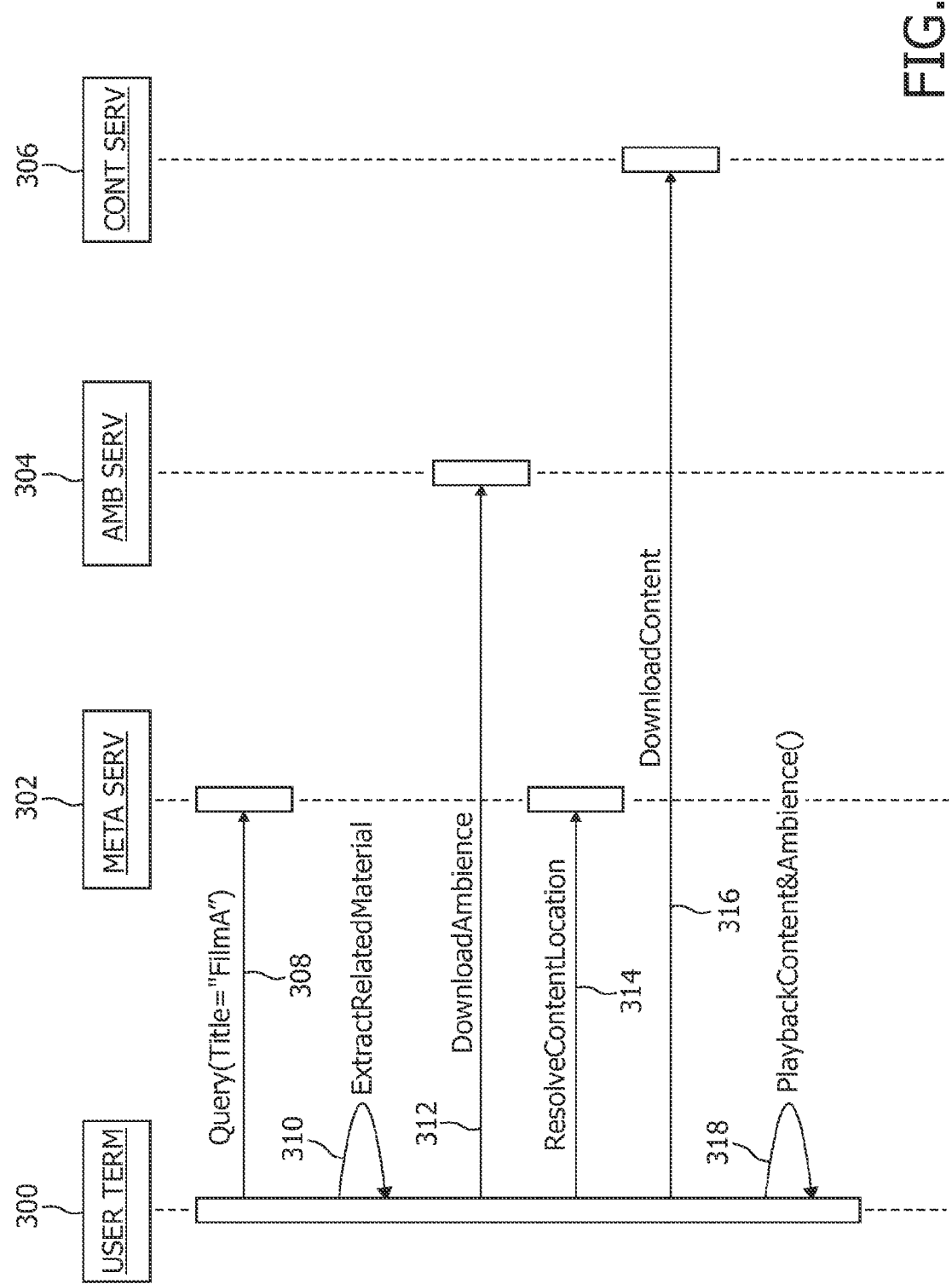
Figure 4:
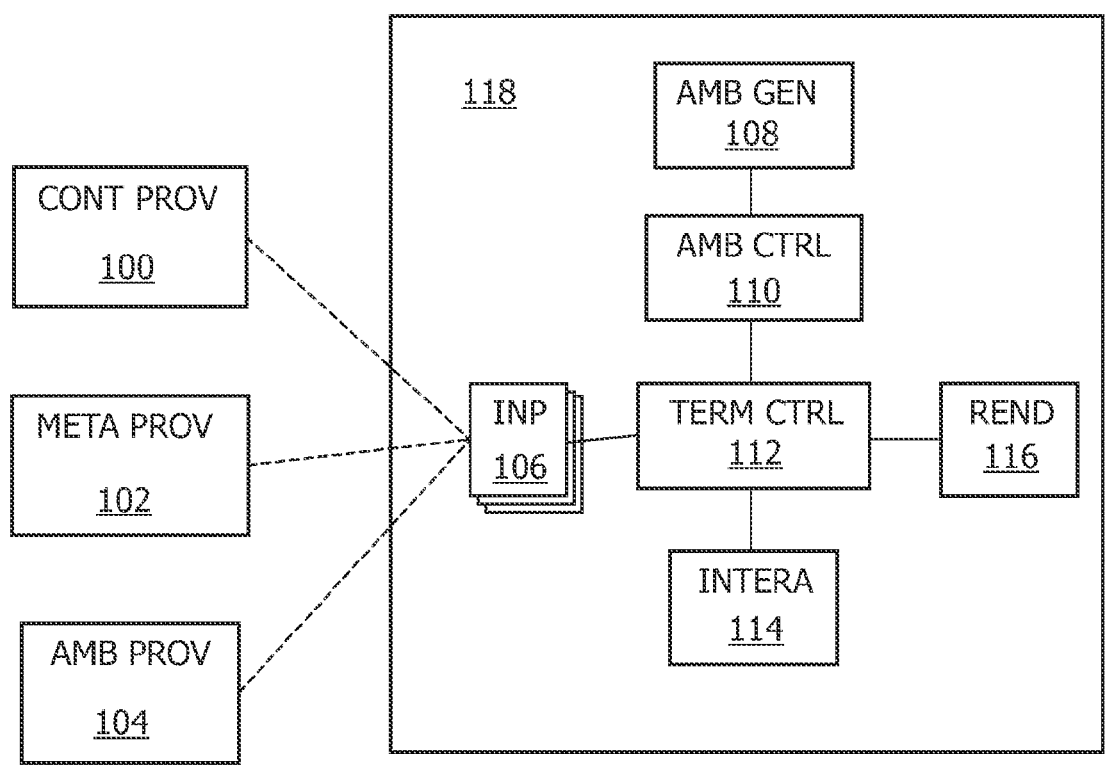

The invention will be elucidated hereinafter with reference to the drawing, wherein FIG. 1 illustrates a context of the invention;
FIG. 2 illustrates an embodiment of the invention;
FIG. 3 is a flowchart representing an exemplary flow of actions when using the invention;
FIG. 4 illustrates an embodiment of the invention.

Metadata is defined as data that describes other data. In the context of AV content metadata describes properties of the content such as title, genre, time, actors etc. It is an important part of finding and describing content, enabling advanced searching and construction of Electronic Program Guides (EPGs). This is becoming increasingly important as the potential sources of content increase e.g. increasing number of traditional channels, availability of content over IP and content on demand.

TV-Anytime is a standard for delivering metadata over for example broadcast and IP transports. It provides a structure for the metadata, a query language for searching, multiple transport mechanisms for delivering the metadata and a mechanism for resolving between the metadata and the location of the content. TV-Anytime has been developed in two phases; phase one specifications are now ETSI standards, phase two specifications have been approved by ETSI recently.

In addition to this, new features are being added to CE devices to provide a more immersive environment. This type of functionality is referred to as Ambience through this invention disclosure. An example of this type of product is the Philips range of "Ambilight" TVs, which provide backlighting based on the content being displayed.

One current issue is that Ambience and Content are not linked. In order to develop an ambient experience one option is to develop algorithms which analyze the content dynamically. This has the advantage of operating on all content but is limited in the types and quality of effects that can be created. Another alternative is to develop a proprietary solution, which embeds the ambience within the content. This would require agreement with a specific content provider and a CE device manufacturer to support the proprietary standard.

This systems and methods set forth herein provide a method to link ambience control data with audio-video content. They also provide a loose coupling between content and ambience. This has the following advantages:

Third party companies can operate as Ambience Providers. Economies of scale can be achieved, as Ambience providers can be associated with multiple content providers.

Ambience can be provided based on the devices present in the home.

Ambience can be provided well in advance or well after content has been created e.g. opens up back catalogues of content.

Changes to Ambience can be made without changing content.

Ambience can be added to content in a staged manner i.e. top 100 titles first.

Billing can be provided for standard content versus enhanced "Ambience" content

Ambience can be targeted to consumer profiles.

FIG. 1 shows from a technical perspective how an ambience provider fits in a configuration of providers and/or servers each providing some of the data relating to audio/video to be rendered at a user terminal. The Figure shows a metadata provider 4 that can provide data relating to AV content available from AV content provider 2. The metadata provider 4 can also provide information about available ambience data available from ambience provider 1. The metadata provider 4 knows which ambience data belongs to which AV program. The providers 1, 2, and 4 are connected by means of a network 6 to a user terminal 8 operated by a consumer. The network 6 can be the Internet or a traditional audio or video broadcasting medium. It is also possible to distribute the AV content via the traditional broadcasting medium, while distributing complementary ambience data via the Internet. The metadata can be distributed by either of the two. Other types of networks are equivalently applicable to the invention, as understood by the skilled person. The user terminal 8 interprets the metadata provided by the metadata provider 4, and receives selected programs from content provider 2 and selected complementary ambience data from the ambience provider 1. The providers may be represented by different companies or the same company, and be implemented on different servers or on the same server.

The metadata can be provided in any desired format. Preferably a standardized metadata format is used, because in that case many devices are able to use the metadata without requiring modifications. Standardized metadata formats that can be adapted to provide ambience functionality as set forth herein include MPEG7, Dublin-core, and DIDL. Also other systems could be adapted to provide the functionality described herein, for example the UPnP Content Directory Service mechanism could be used to distribute the ambience and/or the metadata alongside the content.

One of the metadata formats that can be used is TV-Anytime. One aspect of TV-Anytime is that it is based on references to content called Content Reference Identifiers (CRIDs) rather than on content identifiers. This helps providing the loose coupling outlined above. Usually, the content is only resolved to its location when it is required.

Another aspect of the invention is that the ambience can be provided in a number of ways:

Parameters for an ambience algorithm.

File download containing time stamped cues or device instructions.

Streamed cues or device instructions.

These can either be provided separately or embedded within the content itself.

A number of ways in which TV-Anytime can be used to deliver ambience are outlined in the following.

One option is to use algorithms, for example implemented at the user terminal, to compute ambience. The descriptive metadata, for example as defined by TV-Anytime, can be used to enhance the performance of the ambience algorithms. For example, if the algorithm knows what type of program is being watched then it can adapt. For example the range of colors (e.g. palette index), response time, or the types of devices used as ambience generators, can be adapted. An example fragment of metadata is reproduced below. Not all possible fields are shown. A number of metadata fields may be used to determine the ambience such as Genre or Keyword. These metadata fields are used as parameters of the ambience algorithms. The Genre could be defined as per the default TV-Anytime classification scheme, which involves fields such as Atmosphere, and Intended Audience. Other classification schemes can also be used as understood by the skilled artisan.

Example fragment of metadata:

reference identifier that, when being resolved, returns metadata including at least two content reference identifiers; one content reference identifier pointing to the program without ambience and one content reference identifier pointing to the (program with) ambience.

In another embodiment, a Related Material field of TV-Anytime is used. This field enables metadata to be linked to other related material. Usually, the field refers to a web site or e-mail address relating to the AV content. The ambience, or a reference to the ambience, could be provided by means of this mechanism. An efficient way to include the ambience reference in the Related Material field would be to define a new value for the HowRelated field, such as "Ambience Location". The ambience could for example be specified as a file to download, or as a streamed resource. In the latter case preferably the link conforms to the URI format. Correspondingly, a client device could either download the ambience prior to the event or could stream it alongside the content. Additionally negotiation could take place with the ambience provider based on user and devices present.

TV-Anytime phase 2 introduces the concept of packages of content. This is intended to deliver a collection of items to be consumed at the same time. Examples include alternative audio tracks or interactive content packaged alongside the main content. This could also be used to define a package containing both content and ambience. Packages are defined by an additional Package Table that can be queried and by using the RelatedMaterial field to indicate other members of the same package. Preferably the ambience would have its own CRID and could be resolved with the same mechanism that content is.

In another embodiment, a new set of fields are defined that relate directly to ambience. This can be realized by duplication of standard methods and structures defined by TV-Anytime.

```
<ProgramInformation programId='crid://acmecorp.com/1234567'>
    <BasicDescription>
        <Title>Film A</Title>
        <Synopsis length='short'>An adventure film.</Synopsis>
        <Genre href="urn:tva:metadata:cs:ContentCS:2004:3.4.6.1">
            <Name>Adventure</Name>
        </Genre>
        <Genre href="urn:tva:metadata:cs:IntendedAudienceCS:2004:4.2.3">
            <Name>Adults</Name>
        </Genre>
        <Genre href="urn:tva:metadata:cs:AtmosphereCS:2004:8.6">
            <Name>Breathtaking</Name>
        </Genre>
        <Genre href="urn:tva:metadata:cs:AtmosphereCS:2004:8.47">
            <Name>Spooky</Name>
        </Genre>
        <Keyword>film</Keyword>
        <Keyword>action</Keyword>
        <Related Material>
            <HowRelated href="urn:tva:metadata:cs:HowRelatedCS:2004:10">
                <Name>For more information</Name>
            </HowRelated>
            <MediaLocator>
                <mpeg7:MediaUri>http://acmecorp.com/filmA.html<mpeg7:MediaUri>
            </MediaLocator>
        </Related Material>
    </BasicDescription>
</ProgramInformation>
```

In an embodiment, metadata is included that describes two or more instances of content, one without ambience and one or more with ambience embedded within the content. Either a consumer can choose one of the instances or the device can assess whether it is capable of delivering the proscribed ambient experience and select an appropriate instance automatically. In an embodiment, the metadata may include a content Typically a user terminal comprises one or more ambience generators for generating a particular ambience effect. The devices that deliver ambience may be predetermined and may be the same for every household. In this case, ambience data and ambience metadata may be tailored specifically for the devices that are known to be available. However the increasing potential of home networking could lead to dynamically discoverable networked devices participating in the experience e.g. home automation devices such as HVAC, Fan, Blinds etc. Also user profiles may be allowed which define the type of experiences preferred. Other scenarios involving different sets of ambience generating devices are imaginable. Different sets of ambience can be supported by allowing user profile metadata, for example TV-Anytime compliant metadata. This metadata can either be kept on the home device or transmitted to a remote server. In particular TV-Anytime Phase 2 adds support for targeting where results can be based on device or user profile.

In an embodiment, by using the experience required as defined by the ambience control data, resource management issues are resolved, for example by reserving bandwidth or devices that are required according to the ambience control data. This could also be used in a wireless environment.

For cases where the ambience is provided separate from the content, for example using an ambience provider and a separate content provider, synchronization is an issue. The ambience provider may provide timestamps that correspond directly to the content in order to synchronize. Also any change in content rendering, e.g. pause/resume, will also have to be relayed to the ambience implementation.

Synchronization could be achieved using a proprietary manner, however TV-Anytime defines timestamp features specifically for segmentation. Segmentation allows a program to be split into a number of segments e.g. a news program split into headline, sport and local news segments. This then enables a user to select the required segment. This has to be accurate enough to retrieve the correct location in the content at the beginning and/or end of the segment. To this end TV-Anytime defines a number of time stamping types including a TVAMediaType, which describes a time point relative to a known origin and with an optional duration. In an embodiment, this is reused to define the ambience in relation to a particular program. An ambience could even be fully described in terms of the TV-Anytime schema if desired. If the TV-Anytime Phase 2 packaging option is used then additional synchronization metadata is defined to ensure the contents of a package are delivered at the same time. This way, ambient data and content data are delivered to the user terminal in time for synchronous rendering.

The invention also applies to ambience for live content. Either the algorithm method is used, with parameters supplied by the metadata, or an ambience provider could analyze live content and provide time-delayed ambience. The user terminal may time-shift the content to synchronize the rendering with the time-delayed ambience. Time shifting is already a common feature of personal video recording devices.

Audio and/or video (AV) content is different in nature from ambience. AV is stream based. Ambience is event based i.e. either a time basis or a reactive basis. Ambience can be controlled in a way resembling interactive content as defined by a multimedia home platform (MHP), whereby software applications can be downloaded that correspond to AV content e.g. an application that displays statistics for a live sports program. Ambiences can either be time based (turn lights off 30 seconds into AV) or reactive (turn lights blue when Video turns blue or when a button is pressed). Therefore these ambiences can either be provided by a script or by the engine interpreting content.

Synchronization between content and ambience can be realized using the embodiments set forth. An example of audio video synchronization is that of MPEG1 which uses a clock reference and timestamps to synchronize content. TV-Anytime includes time base and time reference fields as they are required to provide segmentation e.g. splitting a news program into Headline, Business, Sports segments. The ambience can be encoded in a proprietary manner but it is also possible to extend the structures and fields of TV-Anytime to describe an ambience script. Interactive applications require this type of information already in order to synchronize events with content e.g. access to AV synchronization information is already supported by MHP.

The system can cope with a range of end user configurations. For example different users having different preferences, device/network types available, different software versions etc. TV-Anytime and other metadata formats provide a submit data method which allows for user profiles and viewing habits to be sent over the network to enable targeted services. By defining proper structures in the data submitted, ambience generators and home network profiles can also be transmitted with this mechanism. A profile schema is used to describe this. This information can be stored either locally or remotely. Device network protocols that support automatic device discovery can automatically detect new devices that can be used as ambience generators and report their properties to the ambience controller. In addition a user could specify devices that are or are not to be used for ambience generating. Network profiles can also be used to enhance the timing of ambience controlling as the latency of a network can significantly affect the end results e.g. response times. Also if the ambience engine type is discovered, ambience providers can target ambience to provide the best effect with the resources available. By using the CRID resolving method for ambience the location of ambient content can be altered to match the requesting device. The quality of service can be improved by taking into account differing configurations, conflicts, and/or latency of the (home) network to avoid any failure or delay in the delivery of control commands.

The system can cope with device conflicts. If devices are present in a traditional home network that can be used at any time then ensuring the devices and networks are available at the required time is essential. Packaging the ambience as a separate element within for example a TV-Anytime package can solve this. The ambience will have its own CRID or other type of reference and can therefore potentially be acquired well in advance of the content availability. In this way resource management can be performed e.g. reserve the required bandwidth, lock the devices for the required time. In some networks resource management is supported e.g. IEE1394, where this is not supported the ambience engine can prevent conflicts between ambience e.g. similar to existing mechanisms for preventing recording conflicts. This becomes increasingly important if one ambience engine is capable of supporting multiple instances of ambience e.g. multiple rooms.

The system can cope with multiple providers. TV-Anytime and other protocols may support user profiles. By adding preferred suppliers of ambience to the user profile schema this selection of provider can be automated. Also by including a rating system for ambience e.g. user provides thumbs-up or thumbs-down, lists of preferred and non-preferred providers could automatically develop.

Payment for ambience services can also be supported. Using the metadata package a CRID is supplied for ambience and can be acquired separately. Therefore two packages can be provided, one with and one without ambience. Also as CRID resolving is used there may be multiple instances of the ambience when resolved having different pricing structures. Metadata structures for pricing is included in TV-Anytime.

FIG. 2 illustrates how the system is operative to communicate using one or more networks 206. Networks 206 may comprise the Internet, a cable television network, digital television broadcasting systems, a mobile telephony network, an USB network, and other types of network. The servers 200, 202, and 204 may be for example computer systems or broadcasting stations. Also, the servers may be represented by a single physical server system. The servers may also be represented by a storage facility that can be accessed by the user terminal 208. The metadata server 200, ambience server 202, AV content server 204, and user terminal 208 are all connected via one of the networks 206. In any case, the user terminal has access to the servers 200, 202, and 204. In some embodiments, the servers 200, 202, and 204 will also communicate with each other for exchanging information about the programs and ambience control data. The metadata server 200 provides metadata to the user terminal 208 via the network 206. The metadata comprises a content reference identifier that the user terminal 208 can use to obtain a program from the AV content server 204. The metadata may also comprise additional information about the program, such as a program title, genre, plot, and keywords. The metadata may also comprise an additional content reference identifier (which is intended to denote any type of reference) that the user terminal 208 can use to obtain ambience control data from the ambience server 202. Such ambience control data is used to create ambience effects using the ambience generator 210 at the user terminal 208.

FIG. 3 shows an illustrative flow of actions relating to a user terminal 300, a metadata server 302, an ambience server 304, and a content server 306. Upon a user request to see a particular movie "Film A", the user terminal 300 issues a query to the metadata server 302. The metadata server 302 then provides the requested information in metadata format, for example in TV-Anytime format. The metadata contains a content reference identifier where the movie (or program) can be obtained, and also contains information about related material. In step 310, the user terminal parses the metadata to extract the information regarding the related material, and finds a reference to ambience data complementing the movie. Upon the user indicating to use the ambience data (or for example automatically based on user preferences), the ambience data is downloaded from the ambience server in step 312. The ambience may be downloaded as a file before rendering the movie or as a data stream while rendering the movie. In step 314, the location of the audio/video content is resolved by processing the content reference identifier, and after resolving, in step 316, the audio/video content is downloaded. The audio/video content may be downloaded as a file before rendering, or may be downloaded as a data stream while rendering the content. In step 318, the program is rendered and complementary ambience effects are generated based on the retrieved ambience data. Although the flow is discussed here for the example of on-demand systems, it can be used with broadcasting systems with minor modifications as apparent to the skilled person. Alternatively, in step 310 a TV-Anytime package is extracted containing the CRIDs to the program and ambience set forth.

FIG. 4 shows a diagram of a system for supporting entertainment distribution. The Figure shows a content provider 100, a metadata provider 102, an ambience provider 104, and a user terminal 118. The user terminal comprises input means 106 connecting the user terminal to the providers via appropriate respective network connections. The user terminal further comprises an ambience generator 108, an ambience controller 110, a terminal controller 112, interaction means 114 for providing a user interface to a person, and rendering means 116 such as an amplifier with speakers and/or a display. The terminal controller may be a processor with memory for controlling the operations of the user terminal. The user controls the user terminal by means of interaction means 114 and may provide input to request listings of available programs and broadcast times of programs, including additional information about the programs such as title, plot, genre and more technically oriented properties of the program such as the availability of stereo or surround sound and whether the video data has a 4:3 image format or for example a 16:9 image format. The additional information also comprises an availability of ambience data for obtaining an appropriate ambient effect to complement the program. The ambience data may comprise ambience control data or parameters to an ambience generating algorithm. The viewer uses the interaction means 114 to indicate the program to be rendered, whether to use ambience data, and what ambience data to use. Accordingly, the terminal controller 112 uses input means 106 to retrieve the content from content provider 100 and requested ambience data from ambience provider 104. The content is rendered using rendering means 116, and the complementing ambience effects are controlled by ambience controller 110 using the retrieved ambience data. The ambience controller controls the ambience generator which physically provides the ambience effect. Examples of ambience generators include a light, a colored light, a fan, a rumbler, a heater, a blind. The ambience generator 108 can be an Ambilight integrated in the rendering (display) means 116.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. The carrier may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for supporting entertainment distribution via at least one network, comprising:

a content provider for distributing a program;
a metadata provider for distributing metadata, the metadata including both (i) a first content reference identifier of the program and (ii) a plurality of second content reference identifiers pointing to different versions of data relating to ambience complementing the program, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the data relating to ambience complementing the program for use in obtaining an ambient effect to complement the program; and
a user terminal comprising
   an input for receiving the metadata;
   an input for receiving the program using the content reference identifier;
   a rendering unit for rendering the received program;
   an ambience generator for generating the ambient effect, wherein the ambient effect is different from audio or video of the rendering of the received program; and
   an ambience controller, responsive to the data relating to ambience complementing the program retrieved via resolving one of the second content reference identifiers, for controlling the ambience generator synchronously with the rendering of content of the received program.

2. The system according to claim 1, further comprising
an ambience provider for distributing ambience control data for creating a predetermined ambience effect synchronously with a rendering of a predetermined scene of the program;
and wherein
the metadata provider is arranged for including in the metadata a content reference identifier of the ambience control data;
the user terminal further comprises an input for receiving the ambience control data using the content reference identifier of the ambience control data; and
the ambience controller is arranged for causing the ambience generator to generate the predetermined ambience effect synchronously with the rendering of the predetermined scene.

3. The system according to claim 1, wherein
the metadata provider is arranged for including a plurality of content reference identifiers of the program, and the data relating to ambience is indicative of a presence and/or a type of ambience control data accompanying the program when retrieved using the respective content reference identifiers;
the user terminal is arranged for displaying at least some of the data relating to ambience, and for enabling a user to select at least one of the plurality of content reference identifiers for receiving and rendering;
the user terminal comprises an input for receiving the program and the accompanying ambience control data using the selected content reference identifier; and
the ambience controller is arranged for controlling the ambience generator synchronously with the rendering of the content, based on the received ambience control data.

4. The system according to claim 1, wherein
the metadata provider is arranged for including a time stamp indicative of a moment of the program, and the data relating to ambience is associated with the time stamp; and
the ambience controller is arranged for realizing the ambience as specified by the data relating to ambience at the time indicated by the time stamp.

5. The system according to claim 1, wherein
the metadata provider is arranged for including, in the data relating to ambience, information characterizing the program; and
the ambience controller is arranged for dynamically computing an ambience effect, to be generated by the ambience generator, based on the received program, taking into account the information characterizing the program.

6. The system according to claim 1, wherein
the user terminal comprises
   means for generating information relating to properties of the ambience generator and/or relating to user settings; and
   an output for sending the generated information to the metadata provider; and
the metadata provider comprises
   an input for receiving the information from the user terminal; and
   a metadata generator for generating the metadata to be distributed to the user terminal, taking into account the received information.

7. The system according to claim 1, wherein
the ambience controller is arranged for reserving a resource of the ambience generator for use during the rendering of the received program, based on the received data relating to the ambience complementing the program.

8. The system according to claim 1, wherein the metadata is TV-Anytime compliant.

9. The system according to claim 1, wherein the metadata provider is arranged for generating the metadata TV-Anytime compliant, and for including the content reference identifier associated with the ambience control data in a related material field and/or in a package of content relating to the content reference identifier associated with the program.

10. The system according to claim 1, wherein the ambient generator comprises at least one selected from the group consisting of: a light, a fan, a rumbler, a heater, and a blind.

11. A metadata provider for supporting entertainment distribution via at least one network, arranged for distributing metadata, the metadata including both (i) a first content reference identifier of the program and (ii) a plurality of second content reference identifiers pointing to different versions data relating to ambience complementing the program, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the data relating to ambience complementing the program for use by an ambience controller and an ambience generator in obtaining an appropriate ambient effect to complement the program, wherein the ambience controller, responsive to the data relating to ambience complementing the program retrieved via resolving one of the second content reference identifiers, controls the ambience generator synchronously with a rendering of content of the program retrieved via resolving the first content reference identifier.

12. A user terminal comprising:
an input for receiving metadata including both (i) a first content reference identifier of a program and (ii) a plurality of second content reference identifiers pointing to different versions of data relating to ambience complementing the program, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the data relating to ambience complementing the program for use in obtaining an ambient effect to complement the program;
an input for receiving the program using the content reference identifier;
a rendering unit for rendering the received program;
an ambience generator for generating the ambient effect, wherein the ambient effect is different from audio or video of the rendering of the received program;
an ambience controller, responsive to the data relating to ambience complementing the program retrieved via resolving one of the second content reference identifiers, for controlling the ambience generator synchronously with the rendering of content of the received program.

13. A method for supporting entertainment distribution via at least one network, comprising
distributing a program;
distributing metadata, the metadata including both (i) a first content reference identifier of the program and (ii) a plurality of second content reference identifiers pointing to different versions of data relating to ambience complementing the program, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the data relating to ambience complementing the program for use in obtaining an ambient effect to complement the program; and
at a user terminal
receiving the metadata;
receiving the program using the content reference identifier;
rendering the received program;
generating the ambient effect, wherein the ambient effect is different from audio or video of the rendering of the received program; and
controlling, in response to the received data relating to ambience complementing the program retrieved via resolving one of the second content reference identifiers, the generating of the ambient effect synchronously with the rendering of content of the received program.

14. A method for supporting entertainment distribution via at least one network comprising:
receiving metadata including both (i) a first content reference identifier of a program and (ii) a plurality of second content reference identifiers pointing to different versions of data relating to ambience complementing the program, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the data relating to ambience complementing the program for use in obtaining an ambient effect to complement the program;
receiving the program using the content reference identifier;
rendering the received program;
generating the ambient effect, wherein the ambient effect is different from audio or video of the rendering of the received program; and
controlling, in response to the received data relating to ambience complementing the program retrieved via resolving one of the second content reference identifiers, the generating of the ambient effect synchronously with the rendering of content of the received program.

15. A non-transitory computer readable medium, embodied with a computer program comprising instructions for causing a processor to execute the method according to claim 14.

16. A non-transitory computer readable medium, containing an XML file, that, when executed by a computer, is for communication between devices, being TV-Anytime compliant and comprising a package of metadata including both (i) a first content reference identifier referring to audio and/or video content and (ii) a plurality of second content reference identifiers pointing to different versions of data relating to ambience complementing a program of the audio and/or video content, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the ambient control data complementing the program for use by an ambience controller and an ambience generator in obtaining an appropriate ambient effect to complement the program, wherein the ambience controller, responsive to the data relating to ambience complementing the program retrieved via resolving one of the second content reference identifiers, controls the ambience generator synchronously with a rendering of content of the program retrieved via resolving the first content reference identifier.

17. A digital signal for communication between devices embodied in computer-readable instructions stored on a non-transitory computer readable medium executable by a computer, comprising metadata including both (i) a first content reference identifier referring to audio and/or video content and (ii) a plurality of second content reference identifiers pointing to different versions of data relating to ambience complementing a program of the audio and/or video content, wherein the metadata provides a loose coupling between (i) the program and (ii) an ambience of effects created in accordance with specifications external to the program, so that multiple versions of the program can be provided with each version having a different ambience associated with it, and wherein the data relating to ambience complementing the program comprises ambience control data or parameters to an ambience generating algorithm, the ambient control data complementing the program for use by an ambience controller and an ambience generator in obtaining an appropriate ambient effect to complement the program, wherein the ambience controller, responsive to the data relating to ambience complementing the program retrieved via resolving one of the second content reference identifiers, controls the ambience generator synchronously with a rendering of content of the program retrieved via resolving the first content reference identifier.

* * * * *